July 4, 1950  E. W. GARDENHIRE  2,514,045
CARGO AIRPLANE
Filed Nov. 19, 1945  8 Sheets-Sheet 1
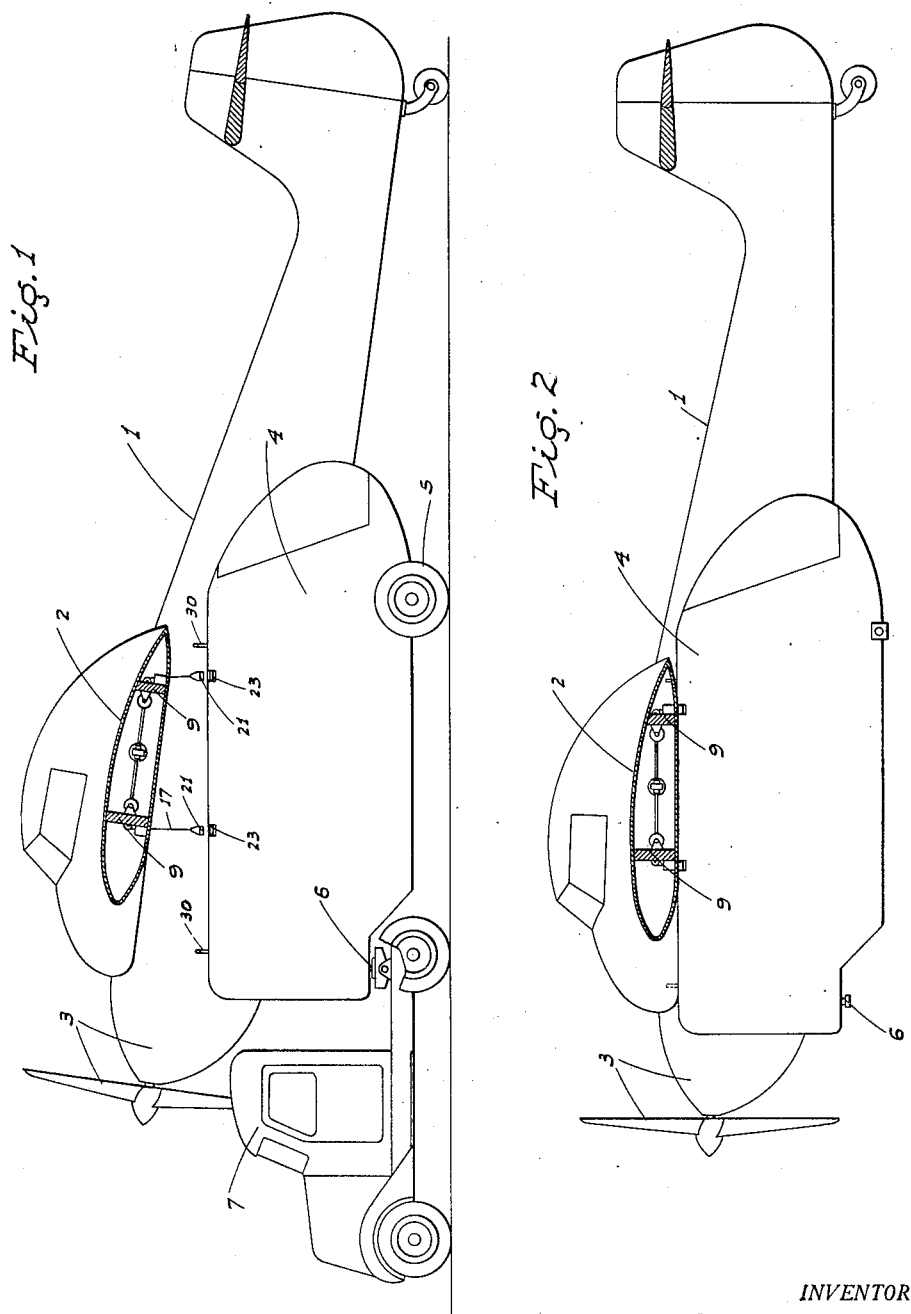
INVENTOR.
E. W. Gardenhire
BY
ATTYS

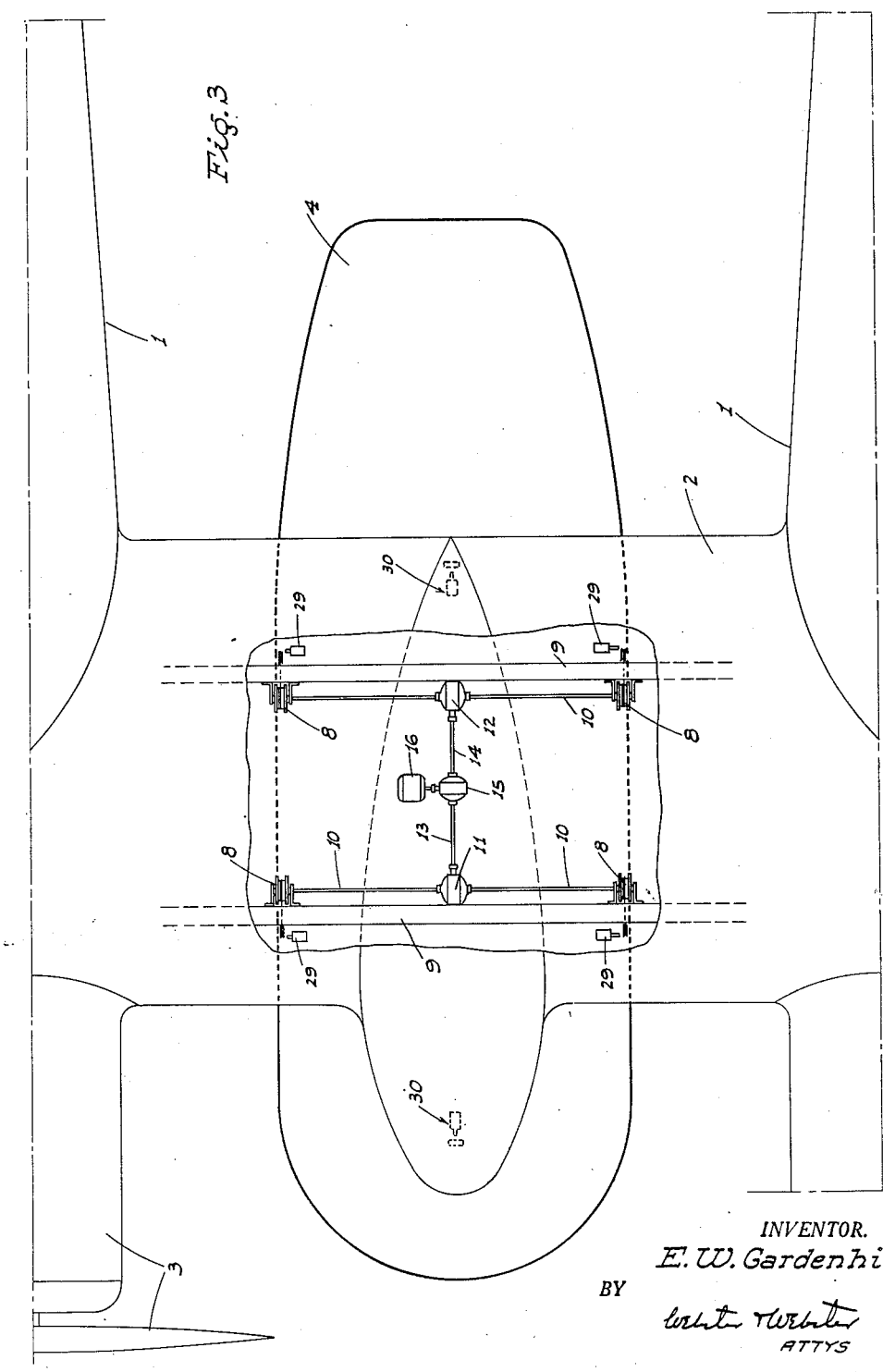

July 4, 1950   E. W. GARDENHIRE   2,514,045
CARGO AIRPLANE

Filed Nov. 19, 1945   8 Sheets-Sheet 3

INVENTOR.
E. W. Gardenhire
BY
ATTYS

July 4, 1950     E. W. GARDENHIRE     2,514,045
CARGO AIRPLANE
Filed Nov. 19, 1945     8 Sheets-Sheet 4
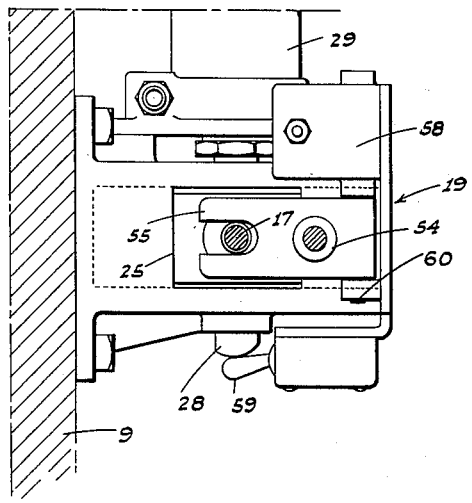
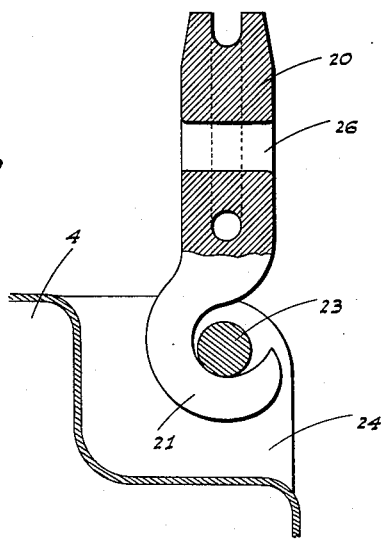
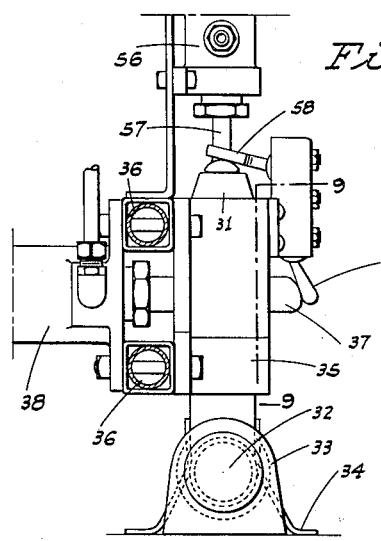
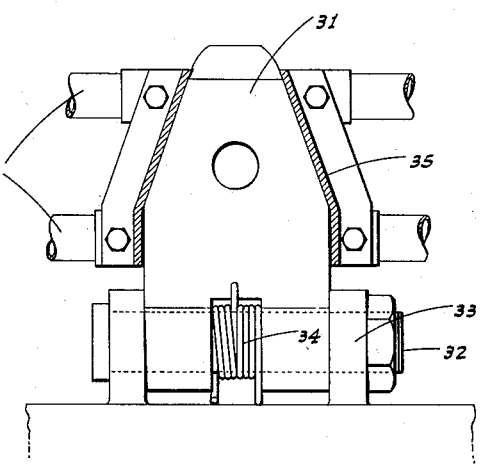
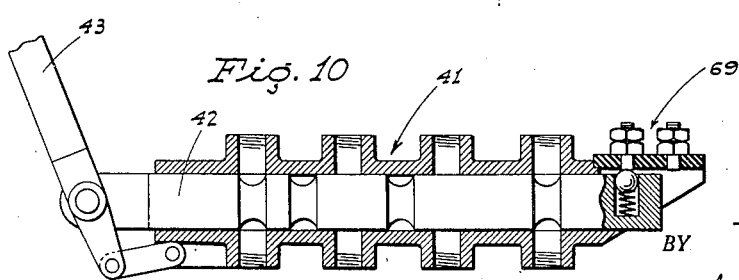
INVENTOR.
E. W. Gardenhire
BY
ATTYS

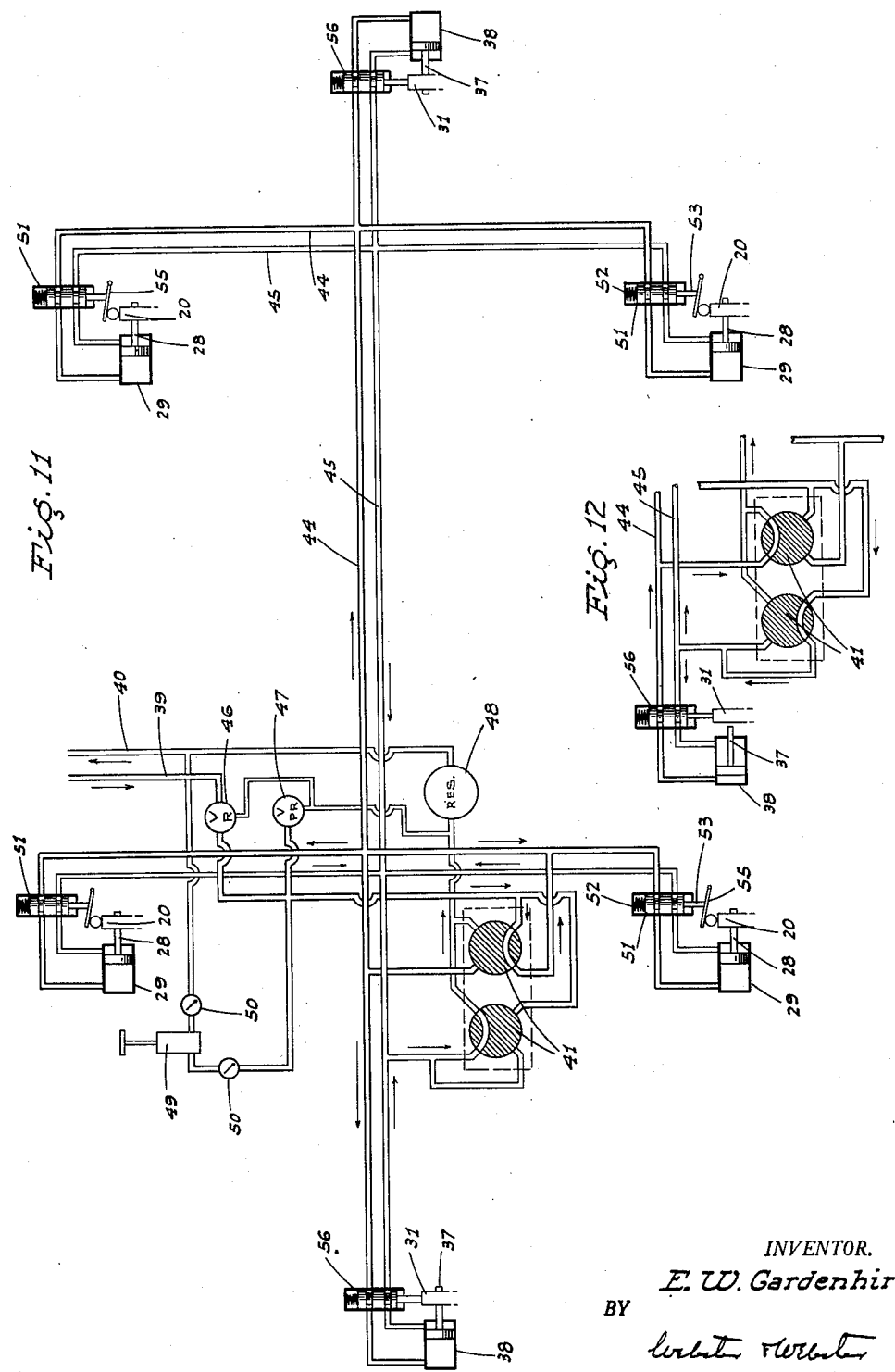

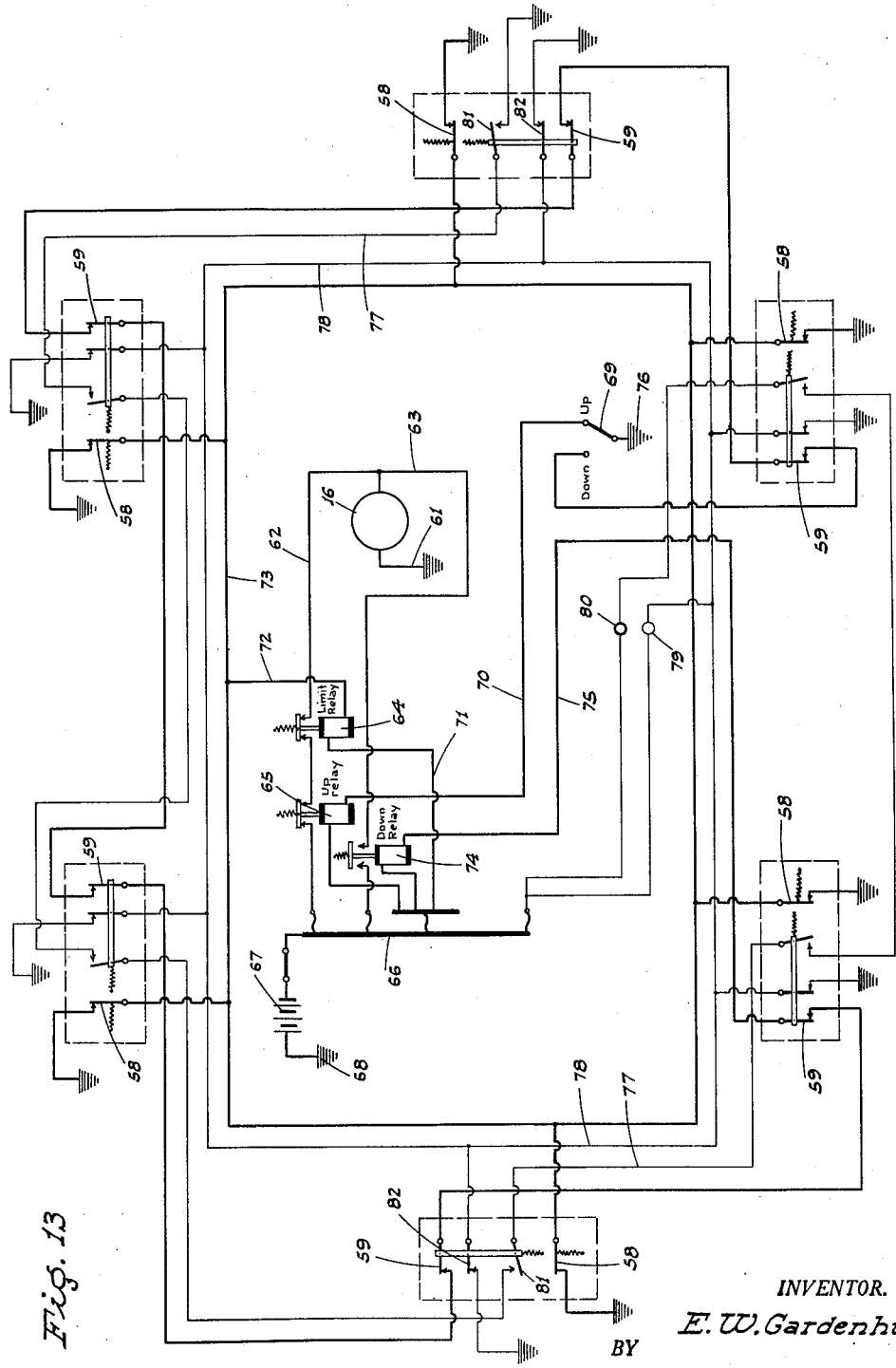

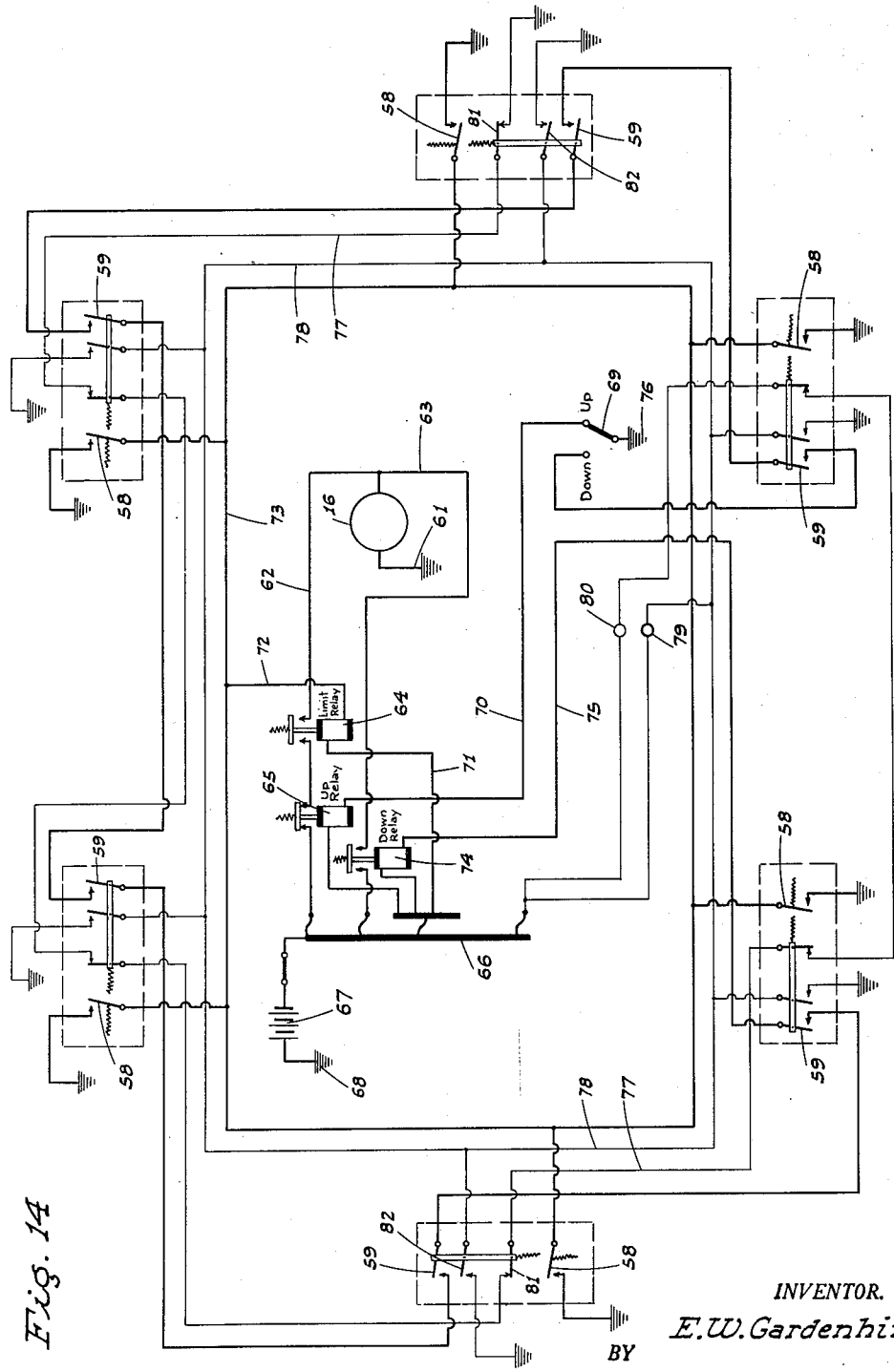

July 4, 1950  E. W. GARDENHIRE  2,514,045
CARGO AIRPLANE

Filed Nov. 19, 1945  8 Sheets-Sheet 8

INVENTOR.
E. W. Gardenhire
BY
Webster Webster
ATTYS

Patented July 4, 1950

2,514,045

UNITED STATES PATENT OFFICE 2,514,045

CARGO AIRPLANE

Elsworth W. Gardenhire,
North Sacramento, Calif.

Application November 19, 1945, Serial No. 629,421

12 Claims. (Cl. 244—118)

This invention relates generally to, and it is an object to provide, an improved cargo airplane especially designed for the transport of freight by air.

Another object of the invention is to provide a novel cargo airplane which comprises, in combination, a heavy-duty airplane and a cargo body detachably connected to the airplane; said cargo body being arranged, when detached, for transport by truck between loading or unloading points and an airport which the airplane serves. In this manner, the cargo body may be loaded at one point; transported by truck to an adjacent airport and there attached to an awaiting airplane; then flown to another airport near the extended destination; and thence released from the airplane and connected to another truck for delivery of the cargo to such destination.

A further object of the invention is to provide novel, power actuated mechanism operative to elevate the cargo body from a truck upward to a predetermined position suspended from the airplane, and to then releasably secure or lock said body in place for flight; the same mechanism being reversible and operative, upon release of the cargo body locking means, to lower said body from the airplane for connection with the truck which awaits the same.

An additional object of the invention is to provide a cargo airplane, as in the preceding paragraph, in which said power actuated mechanism includes, in unique assembly, an electric motor driven winch arrangement operative to raise or lower the cargo body, and cooperating fluid pressure actuated locking units which function to couple or uncouple the elevated cargo body to or from the airplane, respectively; the winch arrangement being under the control of an especially effective electric circuit, while the fluid pressure operated locking units are incorporated in, and are under the control of, a practical and reliable fluid pressure system.

A further object of the invention is to provide a cargo airplane which will be exceedingly effective for the purpose for which it is designed.

These objects are accomplished by means of such structure and relative arrangement of parts as will fully appear by a perusal of the following specification and claims.

In the drawings, similar characters of reference indicate corresponding parts in the several views:

Figure 1 is a side elevation of the cargo airplane showing a cargo body on a truck in position for, but prior to, elevation of said cargo body into connection with the airplane.

Figure 2 is a side elevation showing the cargo body as elevated into carrying position on the airplane.

Figure 3 is a fragmentary somewhat diagrammatic plan view of the airplane and cargo body, illustrating particularly the electric motor driven winch arrangement which is employed to elevate the cargo body from the truck to carrying position on the airplane.

Figure 6 is a cross section on line 6—6 of Fig. 5.

Figure 7 is a fragmentary elevation, partly in section, of one of the lifting hooks, detached.

Figure 8 is a side elevation of one of the stabilizing locking units, and its control parts.

Figure 9 is a cross section on line 9—9 of Fig. 8.

Figure 10 is a sectional elevation of the master reversing valve and switch unit as employed in connection with the fluid pressure control system, and electric control circuit, respectively.

Figure 11 is a diagrammatic plan view of the fluid pressure control system, with the parts thereof in the position when the cargo body is in elevated, locked, flight position.

Figure 12 is a fragmentary plan view similar to Fig. 11, but shows the position of the master valve as reversed to unlock the cargo body and permit lowering thereof.

Figure 13 is a diagram of the electric control circuit, with the parts thereof in the position occupied by the same at the start of, and during, elevation of the cargo body from the truck to the airplane.

Figure 14 is a similar view as Fig. 13, but shows the position of the parts of the electric control circuit when the cargo body is fully elevated and locked in flight position.

Figure 15:
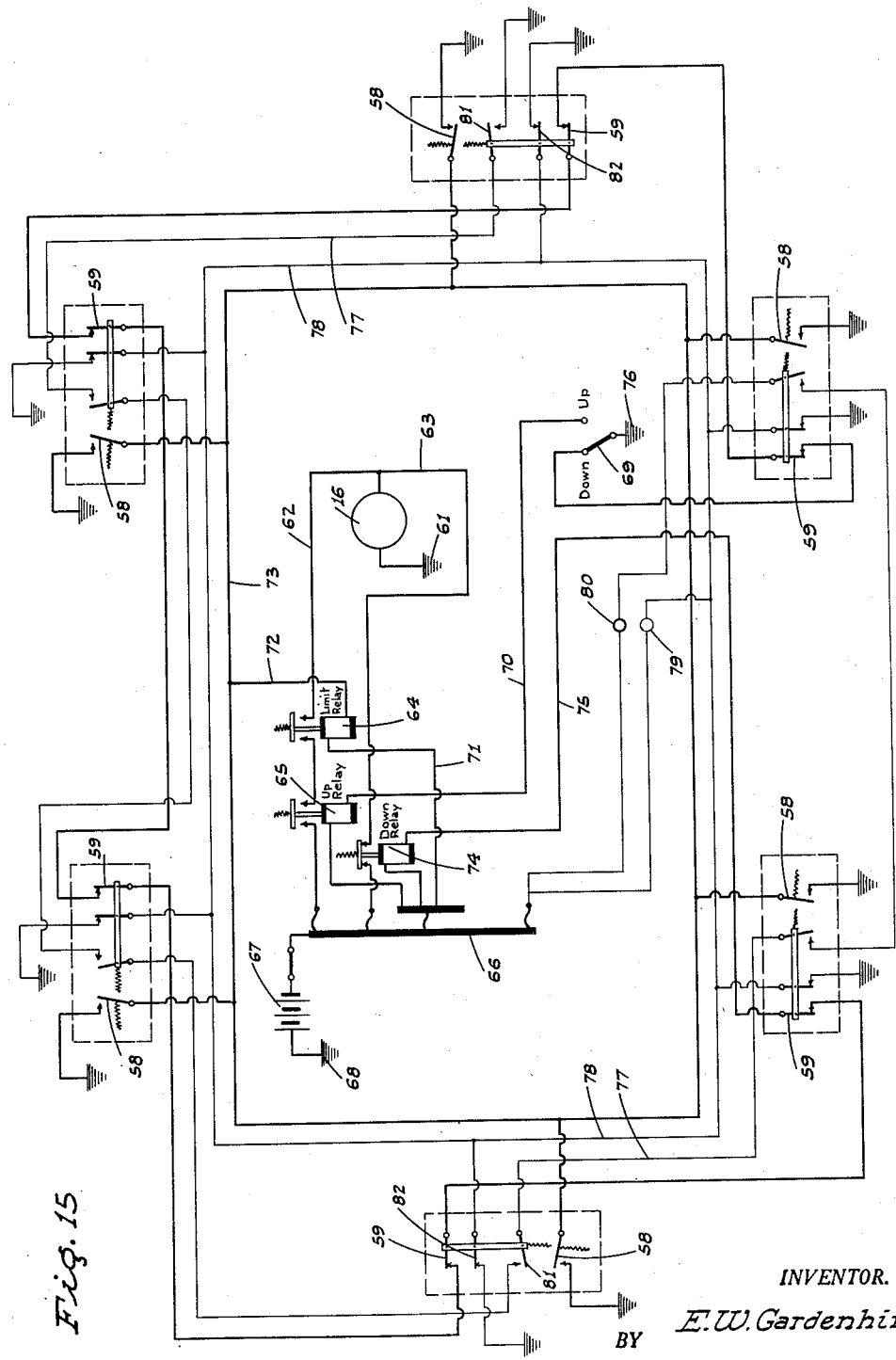

Figure 15 likewise is a diagram of the circuit as shown in Figs. 13 and 14, but illustrates the position of the parts thereof when the master reversing valve and switch is in relatively reversed position to cause unlocking and lowering of the cargo body from the airplane to an awaiting truck.

Referring now more particularly to the characters of reference on the drawings, the invention is here shown as embodied in connection with an airplane which includes a pair of transversely spaced fuselages 1 connected together adjacent their forward ends by means of an intermediate wing section 2. At the forward ends each fuselage 1 supports an engine and propeller unit, as indicated in part at 3.

The airplane may, if desired, be of generally the same configuration as shown in issued U. S. Design Patent No. 133,318.

The numeral 4 indicates an elongated, streamlined cargo body which is adapted to be suspended from, and releasably locked in connection with, the intermediate wing section 2 in the manner hereinafter described in detail; the cargo body 4 being formed, on top, for substantially flat engagement with the bottom of said wing section 2. At its rear end the cargo body 4 includes ground engaging wheels 5, while at its forward end and at the bottom said cargo body is provided with a king pin or fifth wheel unit 6 adapted for releasable connection, when the cargo body 4 is on the ground, with a complementary part on the rear end of a truck 7.

When the cargo body 4 is loaded at a predetermined point, it is transported thereafter to an adjacent airport by means of the truck 7. At the airport the truck 7 is manipulated to position the cargo body 4 centrally below the intermediate wing section 2. The fifth wheel unit 6 is then detached from the complementary part of the truck 7, and thereafter the cargo body 4 is elevated to, and locked in flight position as follows:

The intermediate wing section, within the same, is fitted with an electric motor driven winch arrangement which includes transversely spaced cable drum units 8 mounted on front and rear spars 9 of said intermediate wing section 2. The cable drum units 8 are symmetrically disposed, as shown, and each is driven by a transversely inwardly extending drive shaft 10. The foremost drive shafts 10 are driven from a differential 11, while the rearmost drive shafts 10 are driven by a differential 12. The differentials 11 and 12 are driven by shafts 13 and 14, respectively, from a central differential 15. The central differential 15 is driven by a reversible electric motor 16.

Each of the cable drum units includes a cable 17 which extends over a direction-changing sheave 18 on the adjacent spar 9, and from the sheaves 18 each cable 17 depends downwardly through a corresponding control box, indicated generally at 19. At its lower end each cable 17 is fitted with an attachment eye 20 secured to the shank of a wide hook 21, and which shank is upwardly tapered, as at 22.

The wide hooks 21 are adapted to engage, at their lower ends, with rods 23 carried between upstanding ears 24 on top of the cargo body 4. With the wide hooks 21 in place on the rods 23, the electric motor 16 is run in a direction to cause the cables 17 to wind onto the cable drum units 8, causing the cargo body to be elevated to flight position in engagement with the intermediate wing section 2.

In such flight position, the taper shanks 22 of the hooks 21 matchingly seat from below in downwardly opening sockets 25 formed in the control boxes 19 and rigidly attached to the adjacent spar 9.

In order to compensate for any slight differences in cable length, the hereinbefore described differential drive arrangement for the cable drum units 8 is employed. With such arrangement it will be seen that even though the taper shanks of hooks 21 seat in the sockets 25 at different times, the drive to the individual drum units corresponding to unseated shanks, continues until all of said shanks are properly in place, whereupon the reversible electric motor 16 is stopped by the electric control circuit hereinafter described.

The taper shanks 22 each include a cross opening 26 adapted to match with corresponding openings 27 in opposite sides of the sockets 25, when the shanks 22 are fully seated in said sockets. To prevent accidental escape of the shanks 22 from the sockets 25 when the airplane is in flight, locking pins 28 are projected through the then matching openings 26 and 27. These locking pins are operated by fluid pressure actuated power cylinders 29 of double acting or reversible type disposed in axial alinement with the openings 27, and one of which cylinders is mounted in each control box 19. The locking pins 28 are of course the projecting portions of the piston rods of cylinders 29.

In addition to the above described suspension and locking units for the cargo body 4, there is also provided a pair of stabilizing locking units, indicated generally at 30 in Fig. 1, and shown in detail in Figs. 8 and 9. The locking units 30 stabilize the cargo body 4, during flight, against deflection in a vertical plane, and each of said stabilizing locking units 30 comprises an upstanding tapered tongue 31 carried on a cross rod 32 extending between ears 33 on top of the cargo body; said tongue being maintained substantially vertical but yieldable by means of a double acting spring assembly 34 which permits said tongue to properly aline with and seat in a matching socket 35 formed in the intermediate wing section 2 and carried by cross members 36 therein. The tongue 31 and opposite sides of the socket 35 are formed with matching openings through which a locking pin 37 is adapted to project in the same manner as described in connection with the suspension and locking units shown in Figs. 4-6 inclusive. Each locking pin 37 is controlled by a reversible fluid pressure actuated power cylinder 38. The locking pins 37 are advanced in locking relation through the tongues 31 when the airplane is in flight.

The reversible power cylinders 29 and 38 which operate the locking pins 28 and 37, respectively, are interposed in and controlled by a fluid pressure system such as is shown diagrammatically in Figs. 11 and 12, and which comprises the following:

A pair of conduits 39 and 40 lead from a pump (not shown) to a multiple passage reversing valve 41; the flow in the conduits 39 and 40 being in the directions shown by the arrows in Fig. 11. The multiple passage reversing valve 41 is of piston type, as shown in Fig. 10, and the piston 42 is controlled by a lever 43 accessible to the pilot of the airplane.

The multiple passage reversing valve 41 is operative to control pressure flow, in opposite directions selectively, through a pair of conduits, indicated at 44 and 45, said conduits being suitably branched and the branches connected to the cylinders 29 and 38 on opposite sides of the piston therein. It will thus be seen that when the piston 42 is shifted to one position, the pressure will be applied through the conduit 44 and its branches, while in the opposite position of the piston 42 the pressure will be applied through the conduit 45 and its branches. When pressure is applied through the conduit 44 the cylinders 29 and 38 are operated to cause advance of the locking pins 28 and 37; the reversing valve 41 being set to accomplish this result when the cargo body is to be locked in flight position.

To unlock the pins 28 and 37 the reversing valve 41 is shifted to the position indicated diagrammatically in Fig. 12, whereupon the pressure is applied through conduits 45, reversing the cylinders 29 and 38, resulting in withdrawing of the locking pins 28 and 37.

The fluid pressure control system, as above, includes therein such desirable devices as a relief valve 46, a pressure regulating valve 47, a fluid reservoir 48, and a normally inoperative hand pump 49 useful, in emergency, to produce pressure flow in the system should the pump fail. The hand pump 49 is normally held out of the system by check valves 50.

In order to prevent operation of the cylinders 29 and 38 other than at the proper time, i. e. when the taper shanks 22 and tongues 31 are properly seated in the corresponding sockets 25 and 35 of the suspension and locking units, and the pair of stabilizing locking units, respectively, the following valve arrangement is employed:

Adjacent and above the sockets 25 and 35 there is mounted a double passage piston valve 51 interposed in the adjacent and corresponding branches of the conduits 44 and 45; each such double passage piston valve being urged by a spring 52 in a direction tending to close said valve. Each valve includes an axially projecting piston rod 53 for the purpose of controlling the valve from exteriorly thereof. The double passage piston valves 51 corresponding to the cylinders 29 are mounted in the control boxes 19 with the rod 53 of each valve projecting downwardly and being formed with a taper head 54 on the lower end thereof; said taper head seating in a hinged, vertically swingable fork 55 which straddles the adjacent cable 17. When each such adjacent cable is elevated a point sufficient to cause full projection of the corresponding taper shank 22 into its socket 25, the upper end of the attachment eye strikes the hinged fork 55 and swings the same upwardly, causing raising of the piston rod 53 and consequent opening of the double passage valve 51 so that fluid pressure then feeds to the corresponding cylinders 29.

Thus, as each taper shank 22 comes to seat in the corresponding socket 25 the corresponding part of the fluid pressure control system is automatically opened to cause operation of the related cylinder 29 and so that its locking pin is then power projected through the adjacent taper shank 22 in holding relation thereto.

When a cargo body is to be elevated, the pilot sets the multiple reversing valve 41 to actuate the cylinders 29 in a locking direction, but for the above reason such locking action does not occur at each locking unit until the taper shanks 22 are fully and properly seated.

Similar double passage piston valves are associated with the branches of conduits 44 and 45 leading to the cylinders 38 of the stabilizing locking units 30, and function in a similar manner and for the same purpose. Here, however, the piston rods 57 of the valves 56 are directly engaged and moved by the upper ends of the tongues 31 and no swinging fork is interposed therebetween. Thus, as each tongue comes to seat, it engages and pushes upward on the adjacent piston rod 57, opening the corresponding double passage piston valve 56, whereupon the adjacent cylinder 38 functions to advance the locking pin 37.

The electrical circuit which is employed in connection with the control of the reversible electric motor 16 is shown in detail in Figs. 13, 14, and 15. In association with each of the six locking units of the present embodiment, there is a pair of switches, indicated at 58 and 59, respectively, said switches being normally spring closed. In the main locking units, as shown in detail in Figs. 4-6, the switches 58 are operated from the shaft or hinge pin 60 of the fork 55, whereas in the locking and stabilizing units as shown in Figs. 8 and 9, the switch 58 is directly operated by the corresponding piston rod 57. When the taper shanks 22, and the tongues 31, fully seat in their respective sockets, the switches 58 will be moved from their normal spring-closed to open position.

The switches 59 corresponding to the six locking units are disposed so that the same are engaged and opened by the free ends of the locking pins 28 or 37, whichever corresponds, when said pins are projected to locking position. In short, the switches 58 and 59 tend to spring close, but are automatically opened by the locking pins when the locking units are in operative or flight position.

The reversible electric motor 16 is grounded on one side, as at 61, and on the opposite side includes motor reversing leads 62 and 63. The motor reversing lead 62 is the energizing lead to cause rotation of the motor 16 in a direction to elevate the cargo body, and said lead 62 has interposed therein, in series, a limit relay 64 and a relay 65 which may be termed the "up" relay. Beyond the relays 64 and 65 the motor reversing lead 62 extends to a buss bar 66 connected to a battery 67, grounded as at 68.

A main switch 69 formed on one end of, and actuated by the reversing valve 41 of the fluid pressure system, is employed to control reversing of the motor 16 so that the winch arrangement functions, selectively, to raise or lower the cargo body.

At the beginning of a body elevating operation the main switch 69 is moved by the pilot controlled reversing valve 41, to the position shown in Fig. 13, and at which time said reversing valve is set, as shown in Figs. 10 and 11, to cause operation of cylinders 29 and 30 to advance the locking pins when valves 51 subsequently open. Such switch thus establishes a ground through a lead 70 coupled to the coil of relay 65, the opposite side of which coil is connected to the current supply buss bar 66. This energizes the relay 65 and the same closes. At this time the limit relay 64 is likewise closed, for the reason that one lead 71 of its coil connects to the current supply buss bar 66, whereas the other lead 72 is connected to a ground circuit 73 grounded, in parallel, through each of the then closed switches 58.

Figure 4:
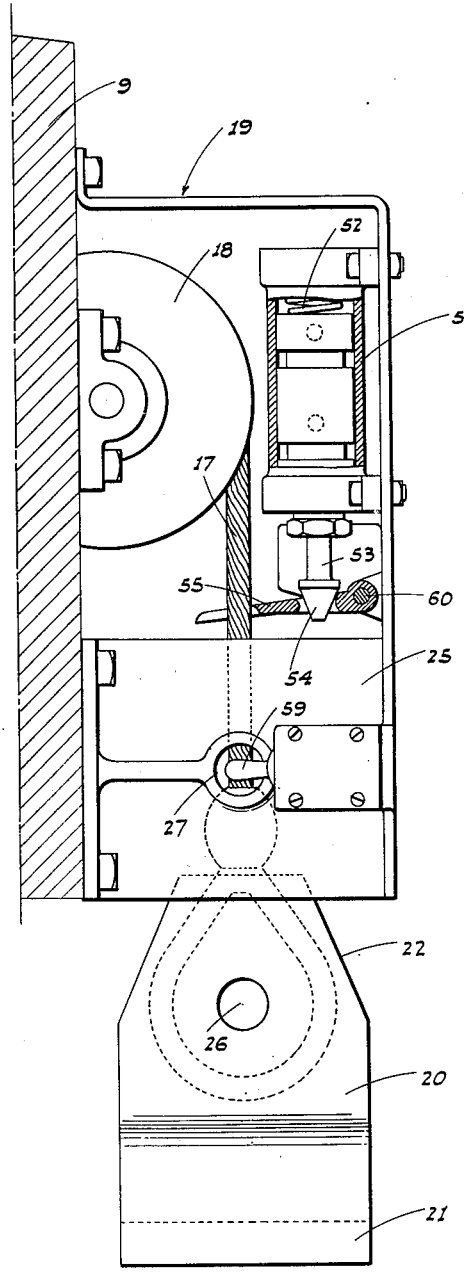
Figure 4 is an enlarged fragmentary elevation of one of the control boxes as associated with one lifting cable, illustrating the position of the control parts when the cable is relatively lowered.
Figure 5:
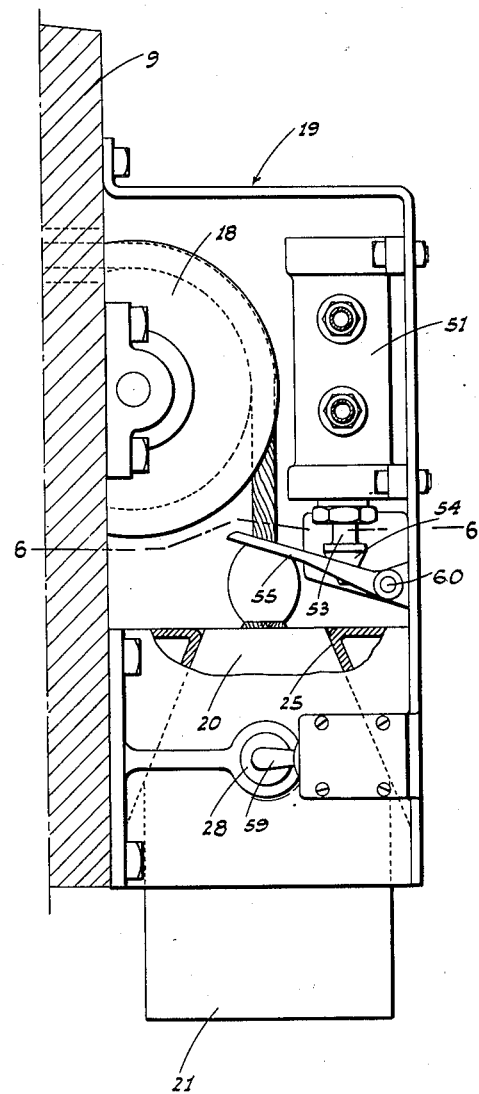
Figure 5 is a view similar to Fig. 4, but shows the position of the control parts within one of the control boxes when the corresponding cable is fully elevated and the cargo body locked in flight position.

As the several locking units are individually brought into flight position, the corresponding cylinders 29 and 38 operate to advance corresponding locking pins in the manner previously described, and the switches 58 are engaged and opened. However, until the last of said switches 58 is opened the motor 16 continues to operate so that all locking units are positively raised to flight position; the differential drive arrangement, as shown in Fig. 1, permitting the electric motor to operate even though certain of the locking units seat and corresponding switches 58 are opened before others. When the last of the locking units is seated or set in flight position, the last of the parallel wired switches 58 is opened. When this occurs the ground circuit 73 is broken, and the limit relay 64 snaps open, breaking the circuit to the motor through lead 62. Also, when the locking units are set in flight position, with the locking pins 28 and 37 advanced, the switches 59 have been engaged and are opened, as shown in Fig. 4.

After a flight, and when it is desired to lower the cargo body from the airplane, the cylinders 29 and 38, followed by the motor 16 are reversely operated by the pilot reversing valve 41 to the position shown in Fig. 12, which likewise reverses switch 69 to the position marked "down." In detail the operation is as follows:

The motor reversing lead 63 extends to the buss bar 66 and has interposed therein a relay 74 whose coil is interposed in a series-connected control circuit 75 which includes therein the switches 59 and the main switch 69 when in the "down" position. This series circuit is grounded at one end, as at 76, and at the other end, or on the opposite side of the coil of relay 74, connects to the current supply buss bar 66.

When the main switch 69 is closed in the "down" position, the series circuit 75 will energize the relay 74 and close the motor lead 63 to cause rotation of said motor in a direction to unwind the cables 17 and lower the cargo body. However, because of the series connection of the switches 59 in circuit 75, operation of the motor in a cargo body lowering direction cannot occur until all of the locking pins 28 and 37 have first been retracted to non-locking position by the reverse operation of cylinders 29 and 38, and the switches 59 freed to spring close. This arrangement is provided so as to assure that lowering of the cargo body cannot begin until all of the locking units have been unlocked.

Signal light circuits, indicated at 77 and 78, including signal lights 79 and 80 in the pilot's compartment, are employed to indicate to the pilot whether the locking units are open or closed. The circuits 77 and 78 include switches 81 and 82 coupled in connection with and for operation by each of the switches 59. The switches 81 and 82 open in reverse directions so that the signal circuit 77 is open when the switches 59 are closed and the locking units open, and so that the signal circuit 78 is open when the switches 59 are open and the locking units closed. Thus the signal circuits warn the pilot if any of the locking units fail to function properly. As the signal circuits 77 and 78 are ancillary in the motor control circuits, the parts of such signal circuits are illustrated only in Figs. 13, 14, and 15, and the mechanical parts of such signal circuits do not appear in the remaining figures of the drawings.

When the cargo body is fully lowered, the valve 41 is shifted to a neutral position, which likewise opens switch 69, whereupon the motor circuit is broken and the entire system is placed out of operation. The hooks 21 are then detached from the cargo body and the latter—after connection to the truck 7—is drawn away for delivery of the contents of said cargo body.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and on which Letters Patent are desired:

1. A lift for carrying a cargo body into a predetermined position on an airplane, such lift comprising a winch assembly mounted on the airplane, such winch assembly including a plurality of cable drums, a separate cable mounted on and depending from each drum, an electric motor, means to impart a differential drive to the respective drums from such motor, a control circuit for operating said motor to wind the cables on the drums, a switch in the circuit corresponding to each cable, said switches being in circuit in a manner such that all must be actuated to cause opening of the motor circuit, means to individually actuate said switches only after the lower ends of the corresponding cables reach a predetermined elevation.

2. A combination as in claim 1 in which the switch actuating means comprise an element mounted on each cable and engageable with one of the switches.

3. A means to lift a cargo body to, and hold it in predetermined position on an airplane, such means including a winch assembly mounted on the airplane, means for releasably connecting the winch assembly to the cargo body, means to then operate the winch assembly to lift the cargo body into such position on the airplane, and a plurality of spaced locking units operable to releasably couple the cargo body to the airplane when such body is in said predetermined position, each such locking unit comprising separable interfitting parts on the airplane and cargo body, respectively, such parts having matching bores, a locking pin mounted coaxially with said bores, a double acting power cylinder connected in driving relation with such pin, and a valve controlled fluid pressure system connected to said cylinder to cause operation thereof to effect the movement of said pin in one direction or the other to either project the pin through said bores or to withdraw the pin from said bores.

4. A combination as in claim 3 including a separate valve interposed in said system adjacent each cylinder and operable to prevent operation of such cylinder until the inter-fitting parts are disposed with their respective bores in register with each other.

5. A combination as in claim 4 in which the separate valve has a projecting valve stem, the movement of one of the interfitting parts effecting movement of the stem in a valve opening direction when such part reaches its inter-fitted position with the corresponding part with the bores in register with each other.

6. A means to lift a cargo body to and hold it in a predetermined position on an airplane, such means including a winch assembly comprising a plurality of cable drums, a separate cable mounted on and depending from each drum, means to connect the cables to the cargo body, an electric motor connected in driving relation with the drums to effect raising and lowering of the cargo body to and from said position on the airplane, a plurality of spaced locking units operable to releasably couple the cargo body to the airplane when said body is in such position thereon, each locking unit including a pair of parts arranged to move into complementary relation when the cargo body is in such position, an energizing circuit for the electric motor operable to drive the same in a direction to wind the cables on the drums, and a normally closed switch in the circuit disposed adjacent each of the locking units and movable in response to movement of one of the parts of the adjacent unit as it moves into such complementary relationship with its adjacent part, such switches being connected in parallel in the circuit whereby to break the circuit only after the locking unit parts have all moved into such complementary relationship.

7. A structure as in claim 6 in which the circuit includes multiple ground leads, each switch being interposed in one of said ground leads.

8. A structure as in claim 6 in which the locking units include an element movable to a position to lock said parts together when they have moved into complementary relationship with each other.

9. A structure as in claim 8 including a second circuit operable to drive the motor in a direction to lower the cargo body, a switch in said second circuit adjacent each locking unit and normally held open and being operable to close in response to movement of said locking element to unlocked position, such last named switches being connected in series in such second circuit whereby such circuit will be closed only when all of the locking elements have moved to unlocked position.

10. A structure as in claim 9 in which the locking element comprises a movable pin, the parts being provided with bores which move into register with each other as such parts move into said complementary relationship, and means to then project the pin through said bores.

11. A structure as in claim 10 in which the pin engages and opens the adjacent switch in the second circuit as the pin is projected through the bores, the switch being provided with a spring which closes it as the pin is withdrawn from the bores.

12. A means to lift a cargo body into predetermined position on an airplane, lock it in said position, and release it from such position and lower it, such means including a winch assembly comprising a plurality of drums, a cable mounted on and depending from said drums, means to connect the free ends of said cables to the cargo body, a reversible electric motor connected in driving relation with the drums, one energizing circuit for the motor operable to drive the motor in a direction to cause the drums to wind in the cables and pull the cargo body into such predetermined position on the airplane, a second energizing circuit for the motor operable to drive the motor in a direction to cause the drums to pay out the cables and lower the cargo body from such position, a plurality of spaced locking units operable to releasably lock the cargo body in such position on the airplane, switch means in the first circuit operable to break such circuit only after the cargo body has been locked in position on the airplane, and switch means in the second circuit operable to close such circuit only after the locking means has been released from the cargo body.

ELSWORTH W. GARDENHIRE.

REFERENCES CITED

The following references are of record in the file of this patent:

UNITED STATES PATENTS

| Number | Name | Date |
|---|---|---|
| 1,975,094 | Fitch | Oct. 2, 1934 |
| 2,063,910 | Fitch | Dec. 15, 1936 |
| 2,075,042 | Knerr | Mar. 10, 1937 |
| 2,095,440 | Hojnowski | Oct. 12, 1937 |
| 2,268,009 | Babb et al. | Dec. 30, 1941 |

FOREIGN PATENTS

| Number | Country | Date |
|---|---|---|
| 139,295 | Great Britain | Mar. 4, 1920 |